United States Patent
Hong et al.

(10) Patent No.: US 12,231,194 B2
(45) Date of Patent: Feb. 18, 2025

(54) METHOD FOR REDUCING POWER CONSUMPTION OF ULTRA-DENSE COOPERATIVE TRANSMISSION NETWORK, AND APPARATUS THEREFOR

(71) Applicant: ELECTRONICS AND TELECOMMUNICATIONS RESEARCH INSTITUTE, Daejeon (KR)

(72) Inventors: Seung Eun Hong, Daejeon (KR); Jee Hyeon Na, Daejeon (KR); Soo Jung Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 18/077,420

(22) Filed: Dec. 8, 2022

(65) Prior Publication Data
US 2023/0198582 A1 Jun. 22, 2023

(30) Foreign Application Priority Data
Dec. 17, 2021 (KR) .................... 10-2021-0181774
Dec. 8, 2022 (KR) .................... 10-2022-0170352

(51) Int. Cl.
*H04B 7/0456* (2017.01)
*H04B 7/0426* (2017.01)
*H04B 7/0491* (2017.01)

(52) U.S. Cl.
CPC ........... *H04B 7/0456* (2013.01); *H04B 7/043* (2013.01); *H04B 7/0491* (2013.01)

(58) Field of Classification Search
CPC .... H04B 7/043; H04B 7/0491; H04B 7/0456; H04B 7/024; H04W 52/0206; H04W 16/32; H04W 72/20
See application file for complete search history.

(56) References Cited

U.S. PATENT DOCUMENTS 9,264,911 B2  2/2016  Lee et al.
10,542,488 B1  1/2020  Marupaduga et al.
(Continued)

FOREIGN PATENT DOCUMENTS

EP          3403339 B1      11/2020
KR       10-1667161 B1      10/2016
KR     10-2021-0054981 A     5/2021

OTHER PUBLICATIONS

Jincan Xin, Hui Gao, Yuande Tan, Ruohan Cao and Yueming Lu, "Energy-Efficient Power Control for Ultra-Dense Networks with Distributed Antenna Arrays", 2019 IEEE International Conference on Communications Workshops (ICC Workshops), Jul. 11, 2019 (Year: 2019).*

(Continued)

*Primary Examiner* — Aristocratis Fotakis
(74) *Attorney, Agent, or Firm* — LRK PATENT LAW FIRM (57) ABSTRACT

An operation method of a CP operating in an ultra-dense cooperative transmission network may include: obtaining a large-scale propagation gain (LPG) matrix representing channel gains between M access points (APs) and K user terminals, M being a natural number greater than or equal to 1, and K being a natural number greater than or equal to 1; obtaining information on a required power consumption; and transmitting, to at least part of the M APs, a control message indicating the at least part of the M APs to perform a control operation for reducing power consumption of the (Continued)

ultra-dense cooperative transmission network based on the required power consumption and the LPG matrix.

14 Claims, 6 Drawing Sheets

(56) References Cited

U.S. PATENT DOCUMENTS

| | | | | |
|---|---|---|---|---|
| 2013/0017855 | A1* | 1/2013 | Hui | H04W 16/28 |
| | | | | 455/524 |
| 2014/0213232 | A1* | 7/2014 | McDonald | H04W 52/0206 |
| | | | | 455/418 |
| 2016/0198448 | A1* | 7/2016 | Takeda | H04W 74/0833 |
| | | | | 370/329 |
| 2016/0255581 | A1* | 9/2016 | Aydin | H04W 52/265 |
| | | | | 370/311 |
| 2018/0091260 | A1* | 3/2018 | Gatherer | H03M 1/007 |
| 2020/0177242 | A1 | 6/2020 | Kim et al. | |
| 2021/0126682 | A1 | 4/2021 | Hong et al. | |
| 2021/0337466 | A1* | 10/2021 | Zou | H04W 8/24 |

OTHER PUBLICATIONS

Qi Wang and Jun Zheng, "A Distributed base station On/Off Control Mechanism for energy efficiency of small cell networks", 2015 IEEE International Conference on Communications (ICC), Sep. 10, 2015 (Year: 2015).*

Seong-Jung Kim and Jeong-Gon Kim, Location-Based Resource Allocation in Ultra-Dense Network with Clustering, Sensors 2021, Jun. 10, 2021 (Year: 2021).*

Wei-Shun Liao, Member, Mirza Golam Kibria, Gabriel Porto Villardi, Ou Zhao, Kentaro Ishizu, and Fumihide Kojima, Coordinated Multi-Point Downlink Transmission for Dense Small Cell Networks, IEEE Transactions on Vehicular Technology, vol. 68, No. 1, Jan. 2019 (Year: 2019).*

* cited by examiner

METHOD FOR REDUCING POWER CONSUMPTION OF ULTRA-DENSE COOPERATIVE TRANSMISSION NETWORK, AND APPARATUS THEREFOR

CROSS-REFERENCE TO RELATED APPLICATIONS

This application claims priority to Korean Patent Applications No. 10-2021-0181774, filed on Dec. 17, 2021, and No. 10-2022-0170352, filed on Dec. 8, 2022 with the Korean Intellectual Property Office (KIPO), the entire contents of which are hereby incorporated by reference.

BACKGROUND

1. Technical Field

Exemplary embodiments of the present disclosure relate to an ultra-dense cooperative transmission network, and more specifically, to a method for reducing power consumption of an ultra-dense cooperative transmission network by adjusting operation parameters of access points (APs) constituting the ultra-dense cooperative transmission network or performing dynamic on/off switching of the APs, and apparatuses for the same.

2. Description of Related Art

In order to accommodate the explosively increasing mobile traffic, a technique of utilizing high-frequency (e.g., millimeter wave, terahertz) bands capable of securing a wider bandwidth, a technique of using a larger number of antennas to improve frequency efficiency, and a technique of deploying base stations at a high density to obtain a cell split gain are being used. Since the increasing trend of mobile traffic will continue, combinations and/or individual applications of the above techniques need to be continuously advanced.

In particular, an ultra-dense cooperative transmission network that deploys transmission and reception points (TRPs) or access points (APs) at high density and performs cooperative transmission between them may be used. In this case, a method for reducing power consumption of a plurality of TRPs or APs may be required.

SUMMARY

Exemplary embodiments of the present disclosure provide an operation method of a central processor (CP) configured to adjust operation parameters of APs constituting an ultra-dense cooperative transmission network and/or control dynamic on/off switching of the APs in order to reduce power consumption of the ultra-dense cooperative transmission network.

Exemplary embodiments of the present disclosure also provide a configuration of the CP.

Exemplary embodiments of the present disclosure also provide the ultra-dense cooperative transmission network comprising the AP and the APs.

According to a first exemplary embodiment of the present disclosure, an operation method of a central processor (CP) operating in an ultra-dense cooperative transmission network may comprise: obtaining a large-scale propagation gain (LPG) matrix representing channel gains between M access points (APs) and K user terminals, M being a natural number greater than or equal to 1, and K being a natural number greater than or equal to 1; obtaining information on a required power consumption; and transmitting, to at least part of the M APs, a control message indicating the at least part of the M APs to perform a control operation for reducing power consumption of the ultra-dense cooperative transmission network based on the required power consumption and the LPG matrix.

The LPG matrix may be expressed as $\Psi = [\varsigma_{mk}]_{m=1,\ldots,M, k=1,\ldots,K} \in \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on effective channels between the M APs and the K user terminals, which is received from the M APs.

The LPG matrix may be expressed as $\Psi = [\varsigma_{mk}]_{m=1,\ldots,M, k=1,\ldots,K} \in \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on a radio frequency (RF) beamforming matrix $W_m^{RF}$ for the K user terminals and statistical channel information between the M APs and the K user terminals, which are received from the M APs.

The LPG matrix may be expressed as $\Psi = [\varsigma_{mk}]_{m=1,\ldots,M, k=1,\ldots,K} \in \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on statistical channel information between the M APs and the K user terminals, which is received from the M APs.

The information on the required power consumption may be received from an operator or an operation, administration and management (OAM) server of the ultra-dense cooperative transmission network, or may be determined by the CP.

The control operation may include: a first operation of deactivating at least part of RF chains of at least one first AP among the M APs; a second operation of reducing resolution of analog-to-digital converters (ADCs) or digital-to-analog converters (DACs) of at least one second AP among the M APs; a third operation of deactivating at least one third AP among the M APs; or a combination thereof In the first operation, the RF chain(s) to be deactivated may be determined based on a size of an eigenvalue of an RF beamforming matrix $W_m^{RF}$ of the at least one first AP for the K user terminals or channel gains of the at least one first AP with the K user terminals identified by the LPG matrix.

In the third operation, the at least one third AP to be deactivated may be determined by: classifying the K terminals into one or more clusters by performing clustering on the K terminals based on column vectors of the LPG matrix; and determining the at least one third AP based on a channel gain between a cluster head of each of the cluster(s) and the M APs, which is identified from the LPG matrix.

According to a second exemplary embodiment of the present disclosure, a central processor (CP) operating in an ultra-dense cooperative transmission network may comprise: at least one processor; and a transceiver controlled by the at least one processor, wherein the at least one processor is configured to perform: obtaining, by using the transceiver, a large-scale propagation gain (LPG) matrix representing channel gains between M access points (APs) and K user terminals, M being a natural number greater than or equal to 1, and K being a natural number greater than or equal to 1; obtaining information on a required power consumption; and transmitting, to at least part of the M APs and by using the transceiver, a control message indicating the at least part of the M APs to perform a control operation for reducing power consumption of the ultra-dense cooperative transmission network based on the required power consumption and the LPG matrix.

The LPG matrix may be expressed as $\Psi = [\varsigma_{mk}]_{m=1,\ldots,M,k=1,\ldots,K} \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on effective channels between the M APs and the K user terminals, which is received from the M APs.

The LPG matrix may be expressed as $\Psi = [\varsigma_{mk}]_{m=1,\ldots,M,k=1,\ldots,K} \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on a radio frequency (RF) beamforming matrix $W_m^{RF}$ for the K user terminals and statistical channel information between the M APs and the K user terminals, which are received from the M APs.

The LPG matrix may be expressed as $\Psi = [\varsigma_{mk}]_{m=1,\ldots,M,k=1,\ldots,K} \mathbb{C}^{M \times K}$, $\varsigma_{mk}$ may indicate a channel gain between an m-th AP among the M APs and a k-th user terminal among the K user terminals, and $\varsigma_{mk}$ may be determined based on information on statistical channel information between the M APs and the K user terminals, which is received from the M APs.

The information on the required power consumption may be received from an operator or an operation, administration and management (OAM) server of the ultra-dense cooperative transmission network, or may be determined by the CP.

The control operation may include: a first operation of deactivating at least part of RF chains of at least one first AP among the M APs; a second operation of reducing resolution of analog-to-digital converters (ADCs) or digital-to-analog converters (DACs) of at least one second AP among the M APs; a third operation of deactivating at least one third AP among the M APs; or a combination thereof.

In the first operation, the RF chain(s) to be deactivated may be determined based on a size of an eigenvalue of an RF beamforming matrix $W_m^{RF}$ of the at least one first AP for the K user terminals or channel gains of the at least one first AP with the K user terminals identified by the LPG matrix.

In the third operation, the at least one third AP to be deactivated may be determined by: classifying the K terminals into one or more clusters by performing clustering on the K terminals based on column vectors of the LPG matrix; and determining the at least one third AP based on a channel gain between a cluster head of each of the cluster(s) and the M APs, which is identified from the LPG matrix.

According to a third exemplary embodiment of the present disclosure, an ultra-dense cooperative transmission network system may comprise: a central processor (CP); and M APs providing services to K user terminals, M being a natural number greater than or equal to 1, and K being a natural number greater than or equal to 1, wherein the CP is configured to: obtain a large-scale propagation gain (LPG) matrix representing channel gains between M access points (APs) and K user terminals; obtain information on a required power consumption; and transmit, to at least part of the M APs, a control message indicating the at least part of the M APs to perform a control operation for reducing power consumption of the ultra-dense cooperative transmission network system based on the required power consumption and the LPG matrix, and wherein the at least part of the M APs are configured to perform the control operation based on the control message.

The control operation may include: a first operation of deactivating at least part of RF chains of at least one first AP among the M APs; a second operation of reducing resolution of analog-to-digital converters (ADCs) or digital-to-analog converters (DACs) of at least one second AP among the M APs; a third operation of deactivating at least one third AP among the M APs; or a combination thereof.

In the first operation, the RF chain(s) to be deactivated may be determined based on a size of an eigenvalue of an RF beamforming matrix $W_m^{RF}$ of the at least one first AP for the K user terminals or channel gains of the at least one first AP with the K user terminals identified by the LPG matrix.

In the third operation, the at least one third AP to be deactivated may be determined by: classifying the K terminals into one or more clusters by performing clustering on the K terminals based on column vectors of the LPG matrix; and determining the at least one third AP based on a channel gain between a cluster head of each of the cluster(s) and the M APs, which is identified from the LPG matrix.

According to the exemplary embodiments of the present disclosure, the overall power consumption of the ultra-dense cooperative transmission network can be reduced by adjusting operation parameters of the APs or performing dynamic on/off switching of the APs in the ultra-dense cooperative transmission network.

DETAILED DESCRIPTION OF THE EMBODIMENTS

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following, a wireless communication network to which exemplary embodiments according to the present disclosure are applied will be described. The wireless communication network to which the exemplary embodiments according to the present disclosure are applied is not limited to the content described below, and the exemplary embodiments according to the present disclosure may be applied to various wireless communication networks.

In the present disclosure, for ease of description, it is assumed that the number of antennas and the number of RF chains of each of APs distributed and deployed in a wireless network are the same. In addition, it is assumed that the number of antennas and the number of RF chains of each of user terminals belonging to the wireless network are the same. However, in various exemplary embodiments of the present disclosure, the number of antennas and the number RF chains included in each of the APs and user terminals may be different.

In order to accommodate the explosively increasing mobile traffic, a technique of utilizing high-frequency (e.g., millimeter wave, terahertz) bands capable of securing a wider bandwidth, a technique of using a larger number of antennas to improve frequency efficiency, and a technique of deploying base stations at a high density to obtain a cell split gain are being used. Since the increasing trend of mobile traffic will continue, combinations and/or individual applications of the above techniques need to be continuously advanced.

In order to solve a large pathloss that occurs when a high frequency band is used, a beamforming technique that concentrates signals in a specific direction using multiple antennas may be used. However, a signal blockage due to an obstacle may occur due to an increase in straightness of signals, and in this case, a method for detouring the signals is required.

By mounting more antennas in one base station, a favorable propagation channel environment capable of generating orthogonal channels and a channel hardening condition capable of mitigating a rapidly changing channel fading phenomenon may be generated. Although frequency efficiency can be improved through them, problems of signal attenuation due to an increase in a separation distance between a terminal and a base station and problems of interference between adjacent base stations still exist. Therefore, the signal attenuation according to a separation distance between a terminal and a base station may be solved by deploying base stations at high density. However, when the base stations are deployed at a high density, interference between the base stations becomes larger, so a technique for controlling the interference is required.

Recently, an ultra-dense distributed MIMO technology has been proposed that utilizes all of the individual advantages while overcoming the above-mentioned problems through utilization of high frequency bands, use of a very large number of antennas, and ultra-dense deployment of base stations, and is attracting attention as a candidate technology for 5G-advanced and 6G communications.

Figure 1:
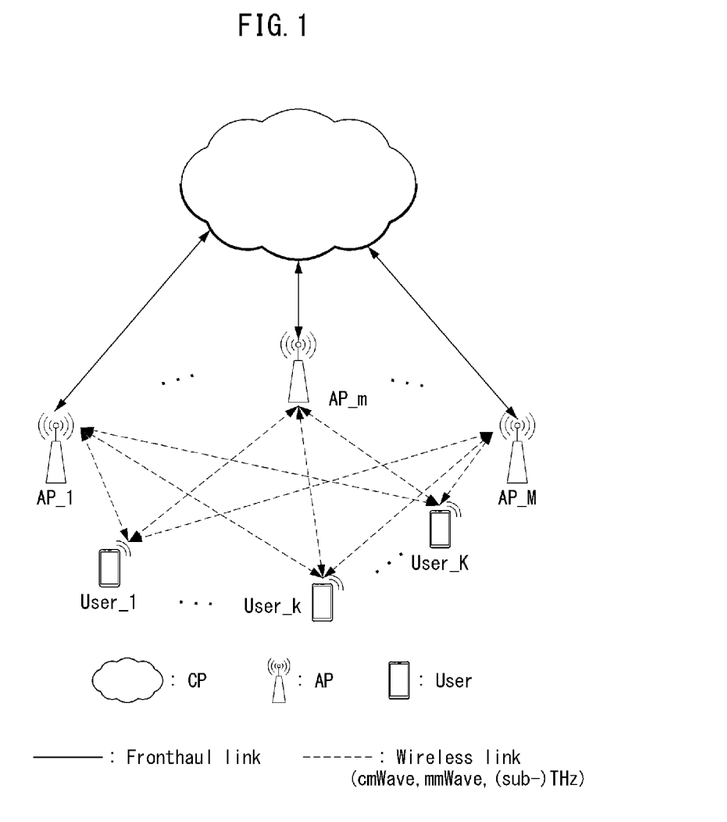
FIG. 1 is a conceptual diagram illustrating a structure of an ultra-dense cooperative transmission network in which high density distributed MIMO technology can be utilized.

FIG. 1 is a conceptual diagram illustrating a structure of an ultra-dense cooperative transmission network in which high density distributed MIMO technology can be utilized.

Referring to FIG. 1, the ultra-dense cooperative transmission network may comprise a central processor (CP), a plurality of APs distributed in the vicinity of user terminals, and user terminals.

In FIG. 1, M (M is a natural number greater than or equal to 1) APs may be denoted as AP_1. . . , AP_m, . . . , and AP_M, and K (K is a natural number greater than or equal to 1) user terminals may be denoted as User_1, . . . , User_k, . . . , and User_K. Here, K, which is the total number of user terminals, is the number of user terminals that are simultaneously serviced by the M distributed APs using the same radio resources. Accordingly, the total number of user terminals serviced using different time/frequency radio resources may increase according to the number of radio resources. In addition, as in the case of a cloud radio access network (C-RAN), each of the distributed APs may be a remote radio head (RRH) having only an antenna and an RF module. Alternatively, each of the distributed APs may be a module having a lower baseband function or a module having an entire baseband function. Each of the distributed APs may be connected to the CP through a fronthaul link, and the CP may control cooperative transmission of the M APs through the fronthaul links. In FIG. 1, a structure in which one AP is connected to the CP through an independent fronthaul is shown.

Figure 2:
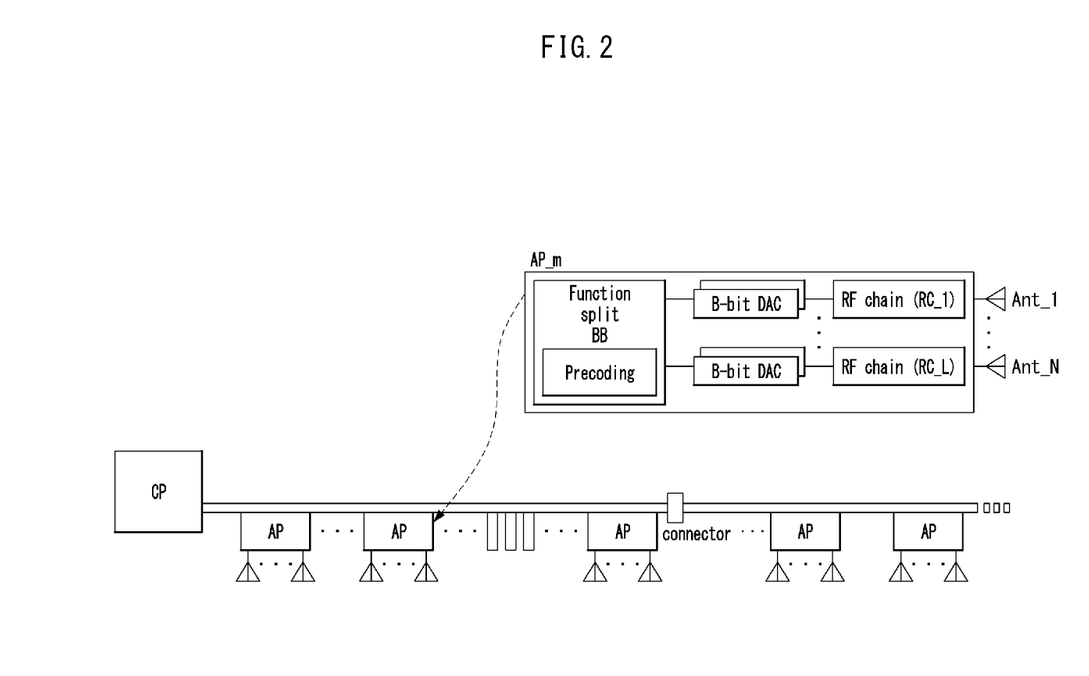
FIG. 2 is a conceptual diagram illustrating a structure of an ultra-dense cooperative transmission network in which a plurality of APs are connected to a CP through a serial fronthaul.

FIG. 2 is a conceptual diagram illustrating a structure of an ultra-dense cooperative transmission network in which a plurality of APs are connected to a CP through a serial fronthaul.

Referring to FIG. 2, a plurality of APs may be connected through a serial fronthaul, and the plurality of APs may be connected to the CP through the serial fronthaul. In addition, the series fronthaul may be extended using a connector.

Referring to FIG. 1 or 2, each of the distributed APs may have N antennas (e.g., Ant_1, ..., Ant N), and L (L is less than or equal to N) RF chains (e.g., RC_1, ..., RC_L). An AP operating in a high frequency band such as millimeter wave or (sub-)terahertz may have a smaller number of RF chains than the number of antennas, and reduce a channel dimension through RF beamforming.

Hereinafter, in the present disclosure, an ultra-dense cooperative transmission network system in which M×N>M×L>>K is established will be considered.

In the above-described ultra-dense cooperative transmission network, since user terminals are serviced through cooperative transmission between APs deployed at high density, interferences may be controlled or utilized. In addition, in the above-described ultra-dense cooperative transmission network, even if a digital-to-analog converter (DAC) and/or an analog-to-digital converter (ADC) having low resolution are used, degradation of service quality may be small. However, when operating the ultra-dense cooperative transport network, network power consumption may significantly increase because a plurality of APs having a plurality of antennas and RF chains are used. In particular, since the distribution of user terminals may vary temporally and/or spatially, power may be inefficiently consumed when only some of the distributed APs provide services to the user terminals.

Therefore, methods for reducing power consumption of the APs that operate inefficiently in the ultra-dense cooperative transmission network are required.

Figure 3:
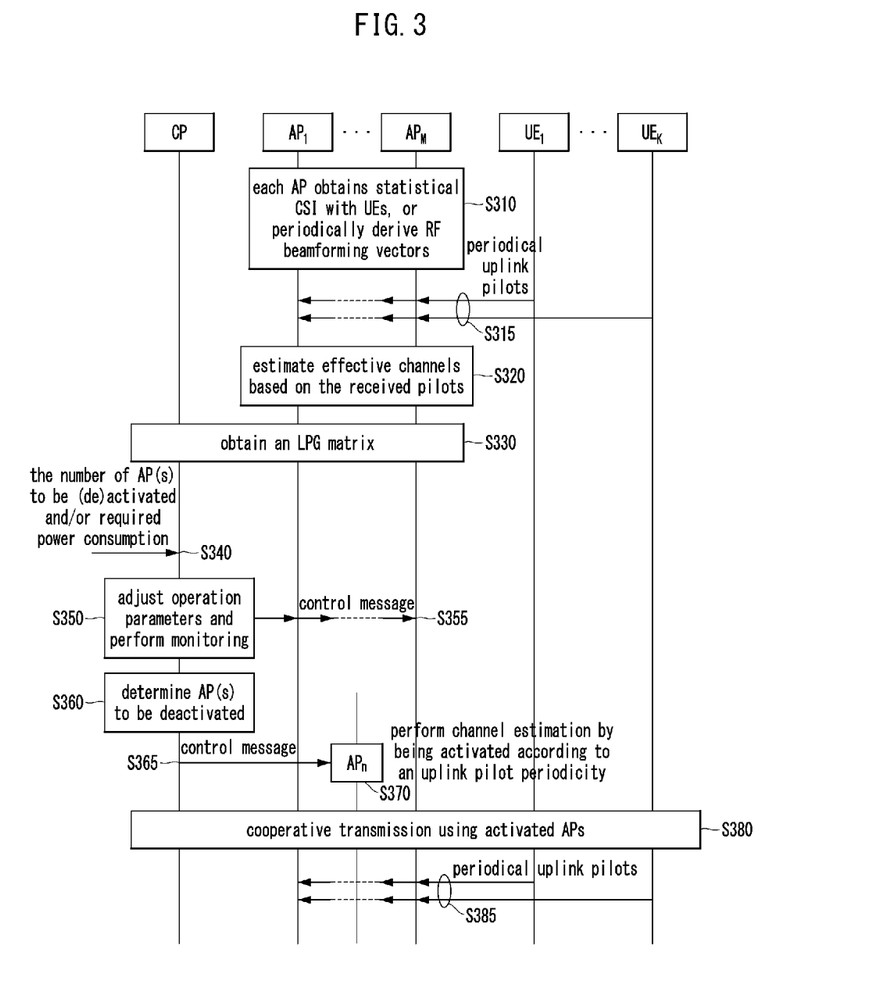
FIG. 3 is a sequence chart for describing an operation procedure between nodes constituting an ultra-dense cooperative transmission network according to an exemplary embodiment of the present disclosure.

FIG. 3 is a sequence chart for describing an operation procedure between nodes constituting an ultra-dense cooperative transmission network according to an exemplary embodiment of the present disclosure.

Referring to FIG. 3, each AP ($AP_1, \ldots, AP_M$) may have a plurality of antennas and may have a plurality of RF chains smaller than the number of antennas. Accordingly, each of the APs may simultaneously form as many beams as the number of RF chains, and adjust beam directions and beam widths using phase shifters attached to the respective antennas. The APs may have different numbers of antennas and different numbers of RF chains, but in the present disclosure, it may be assumed that all APs have the same number N of antennas and the same number L of RF chains for convenience and simplification of description. Here, N≥L is established.

When the AP performs signal transmission and/or reception with the user terminals, RF beamforming may be performed through RF chains of the AP. Various schemes of RF beamforming may be applied, and a quality of transmitted or received signals may vary according to the applied RF beamforming scheme. In the present disclosure, the RF beamforming scheme used will be described for the m-th AP (i.e., $AP_m$). The m-th AP (i.e., $AP_m$) may obtain statistical channel information $R_{mk}=\mathbb{E}\{h_{mk}h_{mk}^H\}$ (which may be referred to as a channel covariance matrix) through communication with the k-th user terminal (i.e., $UE_k$) among K user terminals (i.e., $UE_1, \ldots, UE_k, \ldots, UE_K$) (S310). The m-th AP (i.e., $AP_m$) may calculate an RF beamforming matrix $W_m^{RF}$ for RF beamforming for all user terminals (i.e., user terminals from which pilots can be received with a valid signal strength) as follows (S310). First, a simple average $R_{m,sA}$ of $R_{mk}$ may be calculated as in Equation 1 below.

$$R_{m,sA}=\Sigma_{k=1}^K R_{mk}/K \qquad \text{[Equation 1]}$$

The RF beamforming matrix $W_m^{RF}$ may be calculated as shown in Equation 2 below through eigen-decomposition of $R_{m,sA}$.

$$W_m^{RF}=[\exp(j\measuredangle f_{m,1}^{RF}) \ldots \exp(j\measuredangle f_{m,L}^{RF})] \qquad \text{[Equation 2]}$$

Here, $f_{m,l}^{RF}$ is an eigenvector having an eigenvalue of the l-th size among eigenvectors calculated through eigen-decomposition of $R_{m,sA}$. That is, when the eigenvalues of $R_{m,sA}$ are sorted in order of magnitude, $f_{m,1}^{RF}$ to $f_{m,L}^{RF}$ are eigenvectors corresponding to L eigenvalues in order of magnitude. Also, $j\measuredangle$ f denotes a phase angle for the eigenvector f.

As described above, each AP (i.e., $AP_m$) among the APs deriving the RF beamforming matrix $W_m^{RF}$, ∀m may estimate an effective channel $g_{mk}=W_m^{RF^T}h_{mk}$ between each AP (i.e., $AP_m$) and the user terminal k through uplink pilot signals (S315) transmitted by the user terminal k (S320). In general, the effective channel may be estimated with a least-mean-square-error (MMSE) scheme.

Depending on a level of downlink baseband functional split and/or a baseband precoding scheme between the CP and the AP, each AP may deliver instantaneous information of the effective channel or statistical data of the effective channel to the CP. For example, when downlink baseband precoding is performed in the CP, distributed APs should instantaneously deliver effective channel information to the CP so that the CP performs baseband precoding based on the instantaneous effective channel information. As another example, when the AP performs downlink baseband precoding, but zero-forcing type precoding that requires global channel information for interference cancellation is to be performed, channel information estimated by an individual AP should be shared with all APs to obtain the global channel information. To this end, a scheme in which the APs share effective channel information through the CP or a scheme in which the APs deliver effective channel information to the CP and the CP calculates a zero-forcing baseband precoding matrix and transmits it to each AP may be used.

In the present disclosure, a large-scale propagation gain (LPG) matrix shown in FIG. 4 to be described below may be generated based on the channel information collected from the APs (S330).

Figure 4:
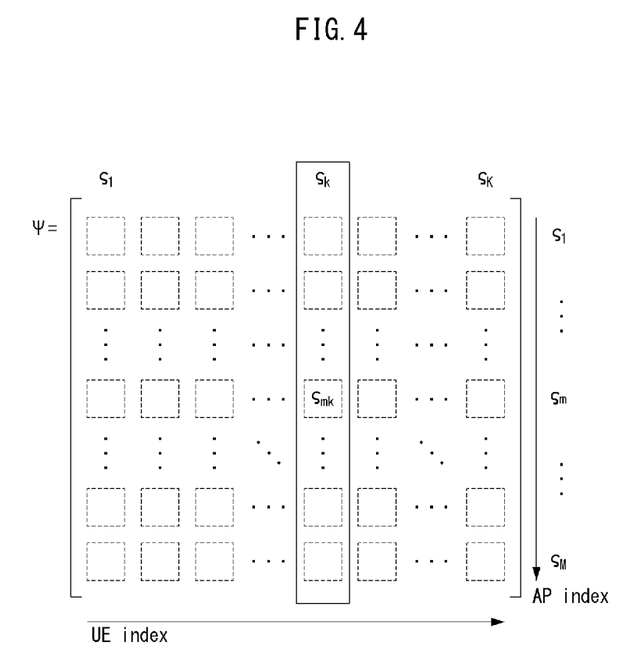
FIG. 4 is a conceptual diagram illustrating a large-scale propagation gain (LPG) matrix according to an exemplary embodiment of the present disclosure.

FIG. 4 is a conceptual diagram illustrating a large-scale propagation gain (LPG) matrix according to an exemplary embodiment of the present disclosure.

Referring to FIG. 4, $\varsigma_{mk}$, which is an element (m, k) of the LPG matrix $\Psi=[\varsigma_{mk}]_{m=1,\ldots,M, k=1,\ldots,K} \in \mathbb{C}^{M \times K}$, may mean a channel gain value between the m-th AP (i.e., $AP_m$) and the k-th user terminal (i.e., $UE_k$). As an example, $\varsigma_{mk}$ may be expressed as a beamforming channel gain as shown in Equation 3 below.

$$\varsigma_{mk}=\mathbb{E}\{Tr(g_{mk}g_{mk}^H)\}=Tr\{(W_m^{RF})^T R_{mk}(W_m^{RF})^*\} \qquad \text{[Equation 3]}$$

That is, when the CP receives an effective channel $g_{mk}$, ∀k for user terminals from $AP_m$, ∀m, $\mathbb{E}\{Tr(g_{mk}g_{mk}^H)\}$ may be used as $\varsigma_{mk}$. Alternatively, when the RF beamforming matrix $W_m^{RF}$ and the statistical channel information $R_{mk}$ are received from $AP_m$, ∀m, the CP may use $Tr\{(W_m^{RF})^T R_{mk}(W_m^{RF})^*\}$ as $\varsigma_{mk}$. Alternatively, $Tr\{R_{mk}\}$ may be used as $\varsigma_{mk}$. In this case, $\varsigma_{mk}$ is determined based on channel information to which RF beamforming is not reflected.

In the LPG matrix, a column vector $\varsigma_k$, $\forall k$ means an LPG vector between the k-th user terminal (i.e., $UE_k$) and all APs, and may be used as a kind of virtual position information for the k-th user terminal (i.e., $UE_k$) within the system. In the LPG matrix, a row vector $\varsigma_m$ may mean an LPG vector between the m-th AP (i.e., $AP_m$) and all user terminals. A p-norm $\|\varsigma_m\|_p$ of $\varsigma_m$ may be used as a channel gain ranking of the m-th AP (i.e., $AP_m$) for all user terminals. That is, it can be interpreted that an AP having a large $\|\varsigma_m\|_p$ provides a good channel to all user terminals.

The CP may determine an average channel state between distributed APs and user terminals using the above-described LPG matrix. The CP may perform power control on signals to be transmitted to the user terminals using the average channel state between the APs and the user terminals identified using the above-described LPG matrix, and may allocate pilot signals to be used by the user terminals. The present disclosure provides methods for reducing power consumed for cooperative transmission using the above-described LPG matrix.

An operator (or an operating system, an operation, administration and management (OAM) server, or the like) operating the ultra-dense cooperative transmission network system according to the present disclosure may monitor power consumption of the network in real time, periodically determine a required power consumption based on the monitoring result, and notify the determined required power consumption to the CP (S340). That is, the determined required power consumption may be notified to the CP of the ultra-dense cooperative transmission network system, and the CP is required to be able to control the power consumed by the entire system based on the required power consumption.

For example, the CP may control the number of distributed APs, the number of active RF chains in each AP, and/or the resolution of the DAC and/or ADC used in each RF chain, which affects the power consumed by the system to control the power consumed by the system. The CP may determine a current power consumption through system monitoring (S350). When the current power consumption exceeds the required power consumption input from the operator or OAM server, the CP may transmit a control message indicating to perform at least one of the following schemes to at least one AP to reduce the power consumed by the entire ultra-dense cooperative transmission network (S355).

As an example of the scheme of reducing power consumed by the ultra-dense cooperative transmission network, the CP may reduce the number of bits of resolution of the DAC and/or ADC used by at least one AP. In general, reducing the number of bits of resolution may reduce the power consumed by the DAC and/or ADC, but may result in larger quantization errors causing a poorer signal quality. Since the signal quality degradation caused by quantization errors can be overcome through cooperative transmission between a plurality of distributed APs, the effect of reducing power consumption may be greater than that of signal quality degradation due to a decrease in the number of resolution bits of the DACs and/or ADCs, resulting in higher energy efficiency. However, in order to support this scheme, the DAC and/or ADC modules of the APs should support variable resolution. When the DAC and/or ADC modules of the APs support variable resolution, the power consumed by the entire system may be adjusted by increasing/decreasing the resolution of the DAC and/or ADC according to circumstances.

As another example of the scheme of reducing power consumed by the ultra-dense cooperative transmission network, the CP may reduce the number of RF chains activated in at least one AP. For example, the CP may reduce the power consumed by the entire system by collectively reducing the number of activated RF chains of all APs constituting the system by one. In this case, the CP may monitor system performance degradation. Meanwhile, when determining RF chain(s) to be deactivated, if the CP indicates to reduce the number of RF chains, the AP may deactivate the RF chain(s) in the order corresponding to the small eigenvalue size in the above-described RF beamforming matrix $W_m^{RF}$. Alternatively, if the CP indicates to decrease the number of RF chains, the CP may indicate AP(s) to deactivate their RF chain(s) based on the channel information determined by the above-described LPG matrix. That is, the CP may indicate the RF chain reduction in the order of APs having small $\|\varsigma_m\|_p$.

As another example of the scheme of reducing power consumed by the entire system, the CP may deactivate some of the APs. In this case, the operator (or operating system, OAM server, or the like) may determine the number of APs to be activated and operated and notify it to the CP (S340), or the CP may determined the number of APs to be activated and operated based on the required power consumption received from the outside. As described above, if the number of APs to be activated and operated (or the number of APs to be deactivated) is determined, the CP may determine APs to be deactivated among the distributed APs (S360), and may transmit a control message indicating the APs determined to be deactivated (S370). In this case, the CP may determine the APs to be deactivated in various manners.

As an exemplary embodiment of a method for determining the AP(s) to be deactivated, the CP may randomly select the AP(s) to be deactivated. In the case of cooperative transmission, since services are provided to user terminals through a plurality of activated APs, service interruption may not occur even when a specific AP is deactivated. Therefore, this scheme may be the simplest scheme to reduce power consumption of the ultra-dense cooperative transmission network through AP deactivation.

As another exemplary embodiment of the method of determining the AP(s) to be deactivated, the CP may utilize the above-described LPG matrix to minimize service quality degradation due to deactivation of the AP(s). For example, the CP may deactivate AP(s) in the order of AP(s) corresponding to small $\|\varsigma_m\|_p$ in the LPG matrix. That is, this scheme may be a scheme of activating APs providing a high channel gain on average to all user terminals and deactivating APs providing a low channel gain on average to all user terminals. In this case, since interference between the APs providing high channel gain to all user terminals may increase, interference control should be precisely performed.

As another exemplary embodiment of the method of determining the AP(s) to be deactivated using the above-described LPG matrix, the CP may perform k-means clustering on the user terminals based on the column vectors $\varsigma_k$, $\forall k$ of the LPG matrix which are virtual position information of the user terminals, and determine a virtual position of a cluster head of each cluster as a representative virtual position of user terminals belonging to each cluster. That is, the virtual position of the head of the i-th cluster $\bar{\varsigma}_i = [\bar{\varsigma}_{1i}, \ldots, \bar{\varsigma}_{mi}, \ldots, \bar{\varsigma}_{Mi}]$ may be used as a representative virtual position of user terminals included in the corresponding cluster. In this case, $\bar{\varsigma}_{mi}$ may indicate a channel gain between the head of the i-th cluster and the m-th AP (i.e., $AP_m$). Therefore, a set obtained by sorting the elements of $\bar{\varsigma}_i$ in ascending order may be $O=\{O_1, O_2, \ldots, O_M\}$ satisfying $\bar{\varsigma}_{O_1 i} \leq \bar{\varsigma}_{O_2 i} \leq \ldots \leq \bar{\varsigma}_{O_M i}$. In this case, since an AP mapped to $O_1$ is an AP with the worst channel gain, the AP mapped to $O_1$ may be considered as a preferential deactivation target. If only one cluster is considered through 1-means clustering, an AP mapped to $O_i$ arranged i-th in ascending order may be deactivated. If max $(M-M_A,K)$ clusters are formed through max $(M-M_A,K)$-means clustering, max $(M-M_A,K)$ cluster heads may be determined, and when AP(s) to be deactivated are selected for each cluster through the above-described method, max $(M-M_A,K)$ APs to be deactivated may be selected. If a condition $M-M_A<K$ is satisfied (i.e., if the number of APs to be deactivated is smaller than the number of candidate APs to be deactivated that are selected), $(M-M_A)$ APs having small $\bar{\varsigma}_i$ may be selected as APs to be deactivated.

As another exemplary embodiment of the method of determining AP(s) to be deactivated using the above-described LPG matrix, instead of the above-described method of sequentially determining AP(s) to be deactivated, a method of sequentially determining AP(s) to be activated may be considered. Even in this case, only one cluster may be considered through 1-means clustering or min $(M_A,K)$ clusters may be considered through min $(M_A,K)$-means clustering. In this case, the CP may sort elements of $\bar{\varsigma}_i$ in descending order and select an AP corresponding to the best value of $\bar{\varsigma}_{mi}$ as an AP to be activated first. On the other hand, when determining AP(s) to be activated through clustering forming min $(M_A,K)$ clusters, if a condition $\min(M_A,K)=K$ is satisfied, the above-described method may be equal to selecting an AP having the highest channel gain for each user terminal.

When the CP determines the AP(s) to be deactivated (or the AP(s) to be activated) through the various exemplary embodiments described above, the CP may indicate the AP(s) to deactivate (or activate). Thereafter, a service may be provided to user terminals through cooperative transmission using only activated APs (S380). On the other hand, when the required power consumption increases and a situation arises in which the deactivated AP(s) needs to be activated again, the CP may need to select AP(s) to be activated from among the deactivated AP(s). In this case, it is possible to sequentially activate APs having high channel gains with the user terminals among the deactivated APs by using the values of $\bar{\varsigma}_{mi}$ used for deactivation. In another exemplary embodiment, the CP may randomly select AP(s) to be activated from among the deactivated APs.

Meanwhile, the deactivated APs may be configure to be temporarily activated according to a preset uplink pilot transmission periodicity for the user terminals, receive uplink pilots of the user terminals (S385), and provide channel measurement results based on the received uplink pilots to the CP.

Figure 5:
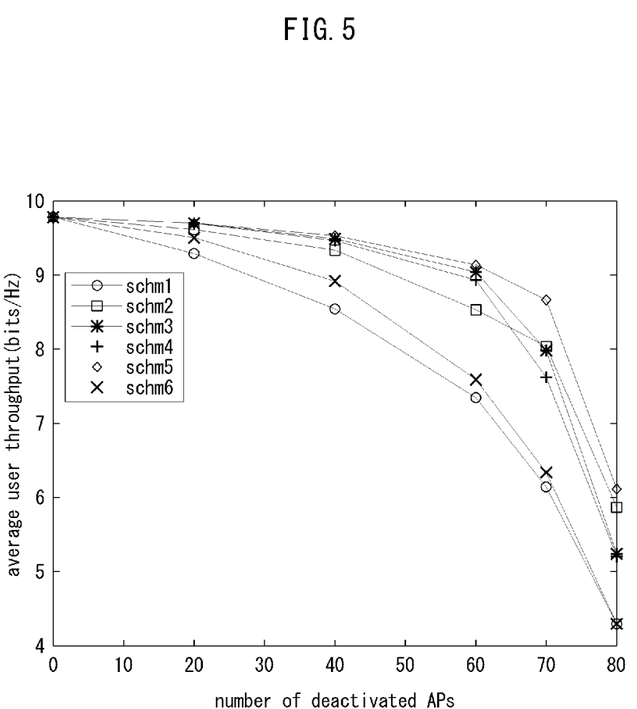
FIG. 5 is a graph illustrating a simulation result for describing user throughputs for various methods according to the exemplary embodiments of the present disclosure.

FIG. 5 is a graph illustrating a simulation result for describing user throughputs for various methods according to the exemplary embodiments of the present disclosure.

Referring to FIG. 5, in an ultra-dense cooperative transmission network in which 100 APs and 30 user terminals are deployed, performances (i.e., user throughputs) according to various schemes for selecting APs to be deactivated are shown.

In FIG. 5, the x-axis indicates the number of deactivated APs, and the y-axis indicates the average user throughputs. In addition, in FIG. 5, 'schm1' indicates the random selection scheme, 'schm2' indicates the scheme of constructing the LPG matrix without considering beamforming vectors and forming min $(M_A,K)$ clusters, 'schm3' indicates the scheme of constructing the LPG matrix considering beamforming effective channels and forming one cluster, 'schm4' indicates the scheme of constructing the LPG matrix considering the beamforming effective channels and forming two clusters, 'schm5' indicates the scheme of constructing the LPG matrix considering beamforming effective channels and forming min $(M_A,K)$ clusters, and 'schm6' indicates the scheme of deactivating APs in the order of AP corresponding to small $\|\varsigma_m\|_p$.

Figure 6:
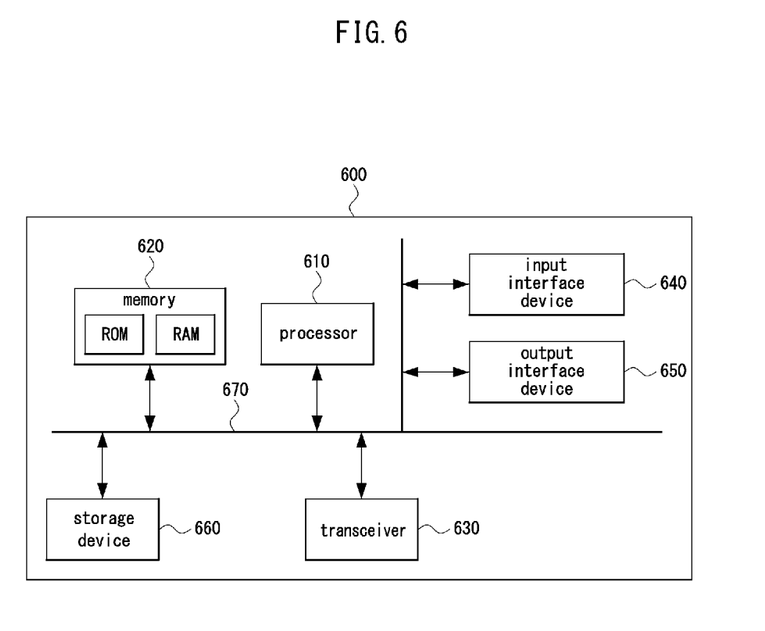
FIG. 6 is a block diagram for describing a configuration of communication nodes to which exemplary embodiments of the present disclosure are applied.

FIG. 6 is a block diagram for describing a configuration of communication nodes to which exemplary embodiments of the present disclosure are applied.

The communication nodes shown in FIG. 6 may be the CP or the APs applicable to the ultra-dense cooperative transmission network system of the present disclosure.

Referring to FIG. 6, a communication node 600 may include at least one processor 610, a memory 620, and a transceiver 630 connected to a network to perform communication. In addition, the communication node 600 may further include an input interface device 640, an output interface device 650, a storage device 660, and the like. The components included in the distributed terminal 600 may be connected by a bus 670 to communicate with each other.

However, each component included in the communication node 600 may be connected to the processor 610 through a separate interface or a separate bus instead of the common bus 670. For example, the processor 610 may be connected to at least one of the memory 620, the transceiver 630, the input interface device 640, the output interface device 650, and the storage device 660 through a dedicated interface.

The processor 610 may execute at least one instruction stored in at least one of the memory 620 and the storage device 660. The processor 610 may refer to a central processing unit (CPU), a graphics processing unit (GPU), or a dedicated processor on which the methods according to the exemplary embodiments of the present disclosure are performed. Each of the memory 620 and the storage device 660 may be configured as at least one of a volatile storage medium and a nonvolatile storage medium. For example, the memory 620 may be configured with at least one of a read only memory (ROM) and a random access memory (RAM).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a central processor (CP) operating in an ultra-dense cooperative transmission network, the operation method comprising:
    obtaining a large-scale propagation gain (LPG) matrix representing channel gains between M access points (APs) and K user terminals, M being a natural number greater than or equal to 1, and K being a natural number greater than or equal to 1;
    obtaining information on a required power consumption; and
    transmitting, to at least part of the M APs, a control message indicating the at least part of the M APs to perform a control operation for reducing power consumption of the ultra-dense cooperative transmission network based on the required power consumption and the LPG matrix,
    wherein the control operation includes:
    a first operation of deactivating at least part of RF chains of at least one first AP among the M APs;
    a second operation of reducing resolution of analog-to-digital converters (ADCs) or digital-to-analog converters (DACs) of at least one second AP among the M APs; and a third operation of deactivating at least one third AP among the M APs; and wherein in the third operation,
    the at least one third AP to be deactivated is determined by:
    classifying the K terminals into one or more clusters by performing clustering on the K terminals based on column vectors of the LPG matrix; and
    determining the at least one third AP based on a channel gain between a cluster head of each of the cluster(s) and the M APs, which is identified from the LPG matrix.

2. The operation method according to claim 1, wherein the LPG matrix is expressed as $\Psi = [\varsigma_{mk}]_{m=1,\ldots,M,k=1,\ldots,K} \in \mathbb{C}^{M \times K}$, $\varsigma_{mk}$ indicates a channel gain between an m-th AP among the M APs and a k-th user terminal among the K user terminals, and $\varsigma_{mk}$ is determined based on information on effective channels between the M APs and the K user terminals, which is received from the M APs.

3. The operation method according to claim 1, wherein the LPG matrix is expressed as $\Psi = [\varsigma_{mk}]_{m=1,\ldots,M,k=1,\ldots,K} \in \mathbb{C}^{M \times K}$, $\varsigma_{mk}$ indicates a channel gain between an m-th AP among the M APs and a k-th user terminal among the K user terminals, and $\varsigma_{mk}$ is determined based on information on a radio frequency (RF) beamforming matrix $W_m^{RF}$ for the K user terminals and statistical channel information between the M APs and the K user terminals, which are received from the M APs.

4. The operation method according to claim 1, wherein the LPG matrix is expressed as $\Psi = [\varsigma_{mk}]_{m=1,\ldots,M,k=1,\ldots,K} \in \mathbb{C}^{M \times K}$, $\varsigma_{mk}$ indicates a channel gain between an m-th AP among the M APs and a k-th user terminal among the K user terminals, and $\varsigma_{mk}$ is determined based on information on statistical channel information between the M APs and the K user terminals, which is received from the M APs.

5. The operation method according to claim 1, wherein the information on the required power consumption is received from an operator or an operation, administration and management (OAM) server of the ultra-dense cooperative transmission network, or is determined by the CP.

6. The operation method according to claim 1, wherein in the first operation, the RF chain(s) to be deactivated are determined based on a size of an eigenvalue of an RF beamforming matrix $W_m^{RF}$ of the at least one first AP for the K user terminals or channel gains of the at least one first AP with the K user terminals identified by the LPG matrix.

7. A central processor (CP) operating in an ultra-dense cooperative transmission network, comprising:
    at least one processor; and
    a transceiver controlled by the at least one processor,
    wherein the at least one processor is configured to perform:
    obtaining, by using the transceiver, a large-scale propagation gain (LPG) matrix representing channel gains between M access points (APs) and K user terminals, M being a natural number greater than or equal to 1, and K being a natural number greater than or equal to 1;
    obtaining information on a required power consumption; and
    transmitting, to at least part of the M APs and by using the transceiver, a control message indicating the at least part of the M APs to perform a control operation for reducing power consumption of the ultra-dense cooperative transmission network based on the required power consumption and the LPG matrix,
    wherein the control operation includes:
    a first operation of deactivating at least part of RF chains of at least one first AP among the M APs;
    a second operation of reducing resolution of analog-to-digital converters (ADCs) or digital-to-analog converters (DACs) of at least one second AP among the M APs; and a third operation of deactivating at least one third AP among the M APs; and wherein in the third operation,
    the at least one third AP to be deactivated is determined by:
    classifying the K terminals into one or more clusters by performing clustering on the K terminals based on column vectors of the LPG matrix; and
    determining the at least one third AP based on a channel gain between a cluster head of each of the cluster(s) and the M APs, which is identified from the LPG matrix.

8. The CP according to claim 7, wherein the LPG matrix is expressed as $\Psi = [\varsigma_{mk}]_{m=1,\ldots,M,k=1,\ldots,K} \in \mathbb{C}^{M \times K}$, $\varsigma_{mk}$ indicate a radio frequency (RF)-beamformed channel gain between an m-th AP among the M APs and a k-th user terminal among the K user terminals, and $\varsigma_{mk}$ is determined based on information on effective channels between the M APs and the K user terminals, which is received from the M APs.

9. The CP according to claim 7, wherein the LPG matrix is expressed as $\Psi=[\varsigma_{mk}]_{m=1,\ldots,M,k=1,\ldots,K} \in \mathbb{C}^{M \times K}$, $\varsigma_{mk}$ indicate a radio frequency (RF)-beamformed channel gain between an m-th AP among the M APs and a k-th user terminal among the K user terminals, and $\varsigma_{mx}$ is determined based on information on a radio frequency (RF) beamforming matrix $W_m^{RF}$ for the K user terminals and statistical channel information between the M APs and the K user terminals, which are received from the M APs.

10. The CP according to claim 7, wherein the LPG matrix is expressed as $\Psi=[\varsigma_{mk}]_{m=1,\ldots,M,k=1,\ldots,K} \in \mathbb{C}^{M \times K}$, $\varsigma_{mk}$ indicate a radio frequency (RF)-beamformed channel gain between an m-th AP among the M APs and a k-th user terminal among the K user terminals, and $\varsigma_{mk}$ is determined based on information on statistical channel information between the M APs and the K user terminals, which is received from the M APs.

11. The CP according to claim 7, wherein the information on the required power consumption is received from an operator or an operation, administration and management (OAM) server of the ultra-dense cooperative transmission network, or is determined by the CP.

12. The CP according to claim 7, wherein in the first operation, the RF chain(s) to be deactivated are determined based on a size of an eigenvalue of an RF beamforming matrix $W_m^{RF}$ of the at least one first AP for the K user terminals or channel gains of the at least one first AP with the K user terminals identified by the LPG matrix.

13. An ultra-dense cooperative transmission network system comprising:
a central processor (CP); and
M APs providing services to K user terminals, M being a natural number greater than or equal to 1, and K being a natural number greater than or equal to 1, wherein the CP is configured to: obtain a large-scale propagation gain (LPG) matrix representing channel gains between M access points (APs) and K user terminals; obtain information on a required power consumption; and transmit, to at least part of the M APs, a control message indicating the at least part of the M APs to perform a control operation for reducing power consumption of the ultra-dense cooperative transmission network system based on the required power consumption and the LPG matrix, and wherein the at least part of the M APs are configured to perform the control operation based on the control message, wherein the control operation includes:
a first operation of deactivating at least part of RF chains of at least one first AP among the M APs;
a second operation of reducing resolution of analog-to-digital converters (ADCs) or digital-to-analog converters (DACs) of at least one second AP among the M APs; and a third operation of deactivating at least one third AP among the M APs; and wherein in the third operation,
the at least one third AP to be deactivated is determined by:
classifying the K terminals into one or more clusters by performing clustering on the K terminals based on column vectors of the LPG matrix; and
determining the at least one third AP based on a channel gain between a cluster head of each of the cluster(s) and the M APs, which is identified from the LPG matrix.

14. The ultra-dense cooperative transmission network system according to claim 13, wherein in the first operation, the RF chain(s) to be deactivated are determined based on a size of an eigenvalue of an RF beamforming matrix $W_m^{RF}$ of the at least one first AP for the K user terminals or channel gains of the at least one first AP with the K user terminals identified by the LPG matrix.

* * * * *